No. 811,647. PATENTED FEB. 6, 1906.
A. J. LOVE.
BLOCK MOLDING MACHINE.
APPLICATION FILED APR. 17, 1905.
2 SHEETS—SHEET 1.
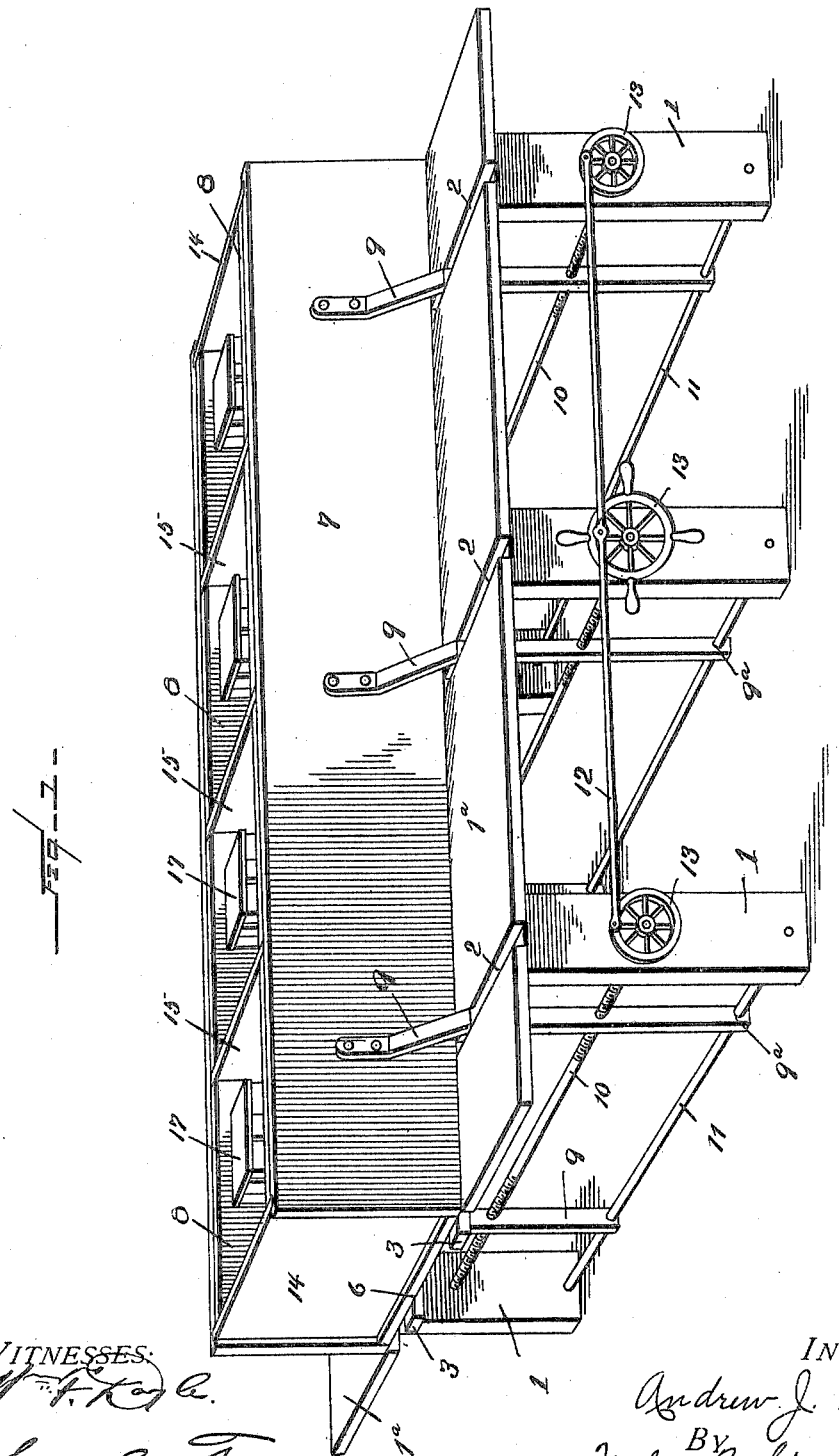
WITNESSES:
INVENTOR
Andrew J. Love,
By Milo B. Stevens & Co.
Attorneys.

No. 811,647. PATENTED FEB. 6, 1906.
A. J. LOVE.
BLOCK MOLDING MACHINE.
APPLICATION FILED APR. 17, 1905.
2 SHEETS—SHEET 2.
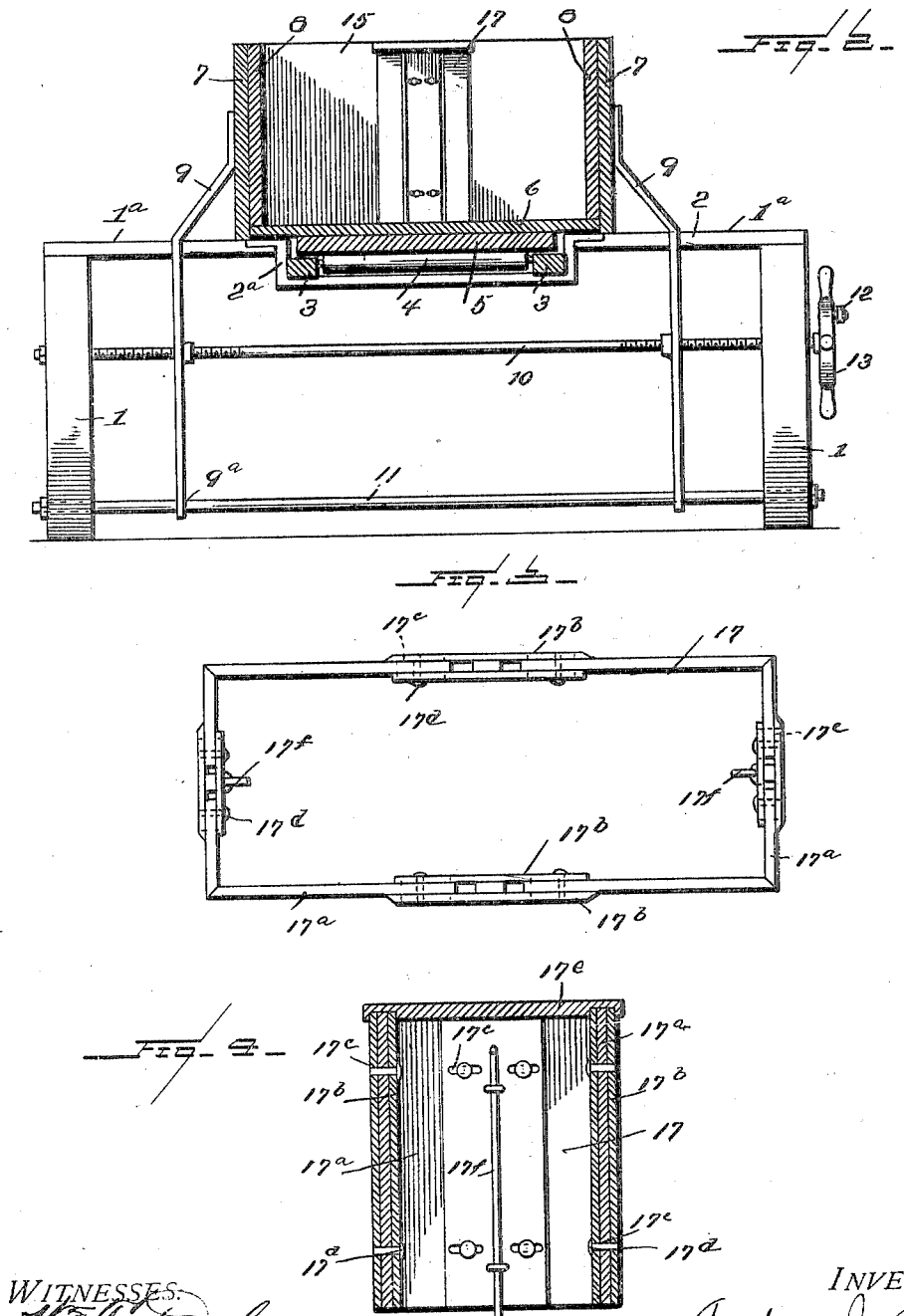

UNITED STATES PATENT OFFICE.

ANDREW J. LOVE, OF ST. LOUIS, MICHIGAN.

BLOCK-MOLDING MACHINE.

No. 811,647.

Specification of Letters Patent.

Patented Feb. 6, 1906.

Application filed April 17, 1905. Serial No. 255,982.

*To all whom it may concern:*

Be it known that I, ANDREW J. LOVE, a citizen of the United States, residing at St. Louis, in the county of Gratiot and State of Michigan, have invented new and useful Improvements in Block-Molding Machines, of which the following is a specification.

This invention is a molding-machine suitable for molding cement building-blocks and the like.

The object of the invention is to form an improved machine capable of continuous operation and characterized by cheapness and simplicity of construction.

A further object is to produce an improved machine capable of molding blocks of different sizes.

A further object is to produce an improved core for use in such machines.

In the accompanying drawings, Figure 1 is a perspective view of the machine as in use. Fig. 2 is a vertical cross-section thereof. Fig. 3 is a plan view of an adjustable core with the top removed. Fig. 4 is a vertical section of the core.

Referring specifically to the drawings, 1 indicates the legs for supporting the machine, and $1^a$ the table or bed supported thereon. This table has slots 2 extending crosswise and in the middle has dropped hangers $2^a$, which support longitudinal bars 3, extending from one end of the machine to the other. Journaled upon these bars are rollers 4, upon which is a movable bottom or conveyer-board 5. The pallets of the mold are indicated at 6 and are laid upon the bottom board. These pallets may be of any desired width, and usually their side edges project beyond the board 5, so that they may be readily grasped to lift and remove the block after molding.

As shown in the drawings, there are a plurality of molds formed upon the bed of the machine by means of side boards, partitions therebetween, and the pallets at the bottom. The side boards are indicated at 7, extending the entire length of the machine and having secured on the inner side thereof the design or other face-plates 8. These side boards are carried by standards 9, which work laterally through the slots 2 and are tapped to receive the screws 10, which have right and left threads at opposite ends thereof. The lower ends of the standards 9 have eyes $9^a$, which slide on the guide-rods 11, extending across between the legs of the machine. By means of the screws the side boards 7 may be brought together or forced apart. Wheels 13 on the ends of the several screws are connected by a rod 12, which causes all the screws to work together when any wheel is turned, and thus advance or retract the side boards 7 similarly. End boards are indicated at 14 and partitions at 15, the end boards sitting in suitable grooves in the side boards and the partitions sitting in the grooves produced between the ends of the inner side plates 8.

17 indicates the core, which is set in place in each mold before the material is poured in.

In operation pallets of the desired width are laid upon the movable bottom board 5, and then by means of the screws the side boards 7 are closed against the same and the end boards 14, partitions 15, and cores 17 are put in place. The machine is then ready to receive the material. After it is set sufficiently the side boards 7 are opened by reverse movement of the screws, and the molded blocks can be rolled out on the board 5 and rollers 4 and lifted by means of the pallets 6 and conveyed away to dry. By the use of duplicate bottom boards and pallets another set of blocks can be molded as fast as one is removed.

It will be seen that the width of the blocks can be varied, as above indicated, by the use of wider or narrower pallets. Also the length can be varied by using shorter or longer side plates 8 and more or less partitions 15, and of course the depth of the block can be varied as desired.

The core 17 is expansible, as illustrated in Figs. 3 and 4, being composed of side and end pieces $17^a$, secured together at the corners. The ends of these pieces are slidable between middle pieces $17^b$, which are slotted at $17^c$, and pins $17^d$ work in these slots. The core may thus be contracted to permit its easy removal from the block. The cover of the core is indicated at $17^e$ and is rabbeted to receive the top edges of the sides. $17^f$ indicate sliding pins which are secured to the sides $17^b$ and are adapted to be pushed down into holes in the pallet 6 to hold the core in place. When it is desired to remove the core, the cover $17^e$ is removed. This allows the sides and ends to be contracted, and the cores can then be removed by pulling the pins.

What I claim as new, and desire to secure by Letters Patent, is—

1. A molding-machine comprising a bed, a bottom board slidable thereon, a pallet supported on the bottom board and slidable therewith, sides slidable laterally to and from the pallet, and end pieces supported between the sides.

2. A molding-machine comprising a bed, a bottom board slidable thereon, a series of pallets supported on the bottom board and slidable therewith, sides slidable to and from the pallets, and removable partitions and end boards held between the side boards.

3. A molding-machine comprising a bed having crosswise slots, a bottom board slidable lengthwise on the bed, a row of pallets on the bottom board, opposite sides slidable laterally to and from the pallets and having standards extending down through the slots, right and left threaded screws extending across under the bed and engaging the standards to advance or retract the sides, and partitions and end pieces between the sides.

4. In a multiple-block-molding machine, in combination, a bed, a bottom board supported thereon and extending lengthwise thereof, and slidable lengthwise thereon, and constructed to support the blocks and to withdraw the same from between opposite sides of the molds, side boards adjustable laterally on the bed, and mold-sections between the side boards and upon the bottom board.

5. The combination with a mold-bottom, of a hollow core, and sliding pins secured to the side walls of the core and adapted to be pushed down into said bottom to hold the core in place in the mold.

In testimony whereof I have signed my name to this specification in the presence of two subscribing witnesses.

ANDREW J. LOVE.

Witnesses:
A. F. WRIGHT,
HARRIETTE ANDREWS.